US008696840B2

(12) United States Patent
Piana et al.

(10) Patent No.: US 8,696,840 B2
(45) Date of Patent: Apr. 15, 2014

(54) APPARATUS FOR PROCESSING STRIPS OF LABELS AND METHODS OF PROCESSING STRIPS OF LABELS

(75) Inventors: Stefan Piana, Koefering (DE); Anton Niedermeier, Offenstetten (DE)

(73) Assignee: Krones AG (DE)

( * ) Notice: Subject to any disclaimer, the term of this patent is extended or adjusted under 35 U.S.C. 154(b) by 198 days.

(21) Appl. No.: 13/045,138

(22) Filed: Mar. 10, 2011

(65) Prior Publication Data

US 2012/0067502 A1 Mar. 22, 2012

(30) Foreign Application Priority Data

Mar. 12, 2010 (DE) ......................... 10 2010 011 388

(51) Int. Cl.
*B32B 41/00* (2006.01)

(52) U.S. Cl.
USPC ............. 156/64; 156/350; 156/353; 156/354; 156/355; 156/362; 156/363; 156/364; 156/366; 156/367; 156/378; 156/379

(58) Field of Classification Search
USPC ........... 156/64, 350, 353, 354, 355, 362, 363, 156/364, 366, 367, 378, 379
See application file for complete search history.

(56) References Cited

U.S. PATENT DOCUMENTS

| | | | | |
|---|---|---|---|---|
| 4,867,833 | A | 9/1989 | McCoy | |
| 5,017,257 | A * | 5/1991 | Murphy | 156/268 |
| 5,022,950 | A | 6/1991 | Ingalls et al. | |
| 5,045,135 | A | 9/1991 | Meissner et al. | |
| 5,572,433 | A | 11/1996 | Falconer et al. | |
| 5,741,381 | A * | 4/1998 | Dolence et al. | 156/64 |
| 6,019,531 | A | 2/2000 | Henderson et al. | |
| 6,471,802 | B1 | 10/2002 | Williamson | |
| 7,293,592 | B1 | 11/2007 | Golicz et al. | |
| 2003/0010433 | A1 | 1/2003 | Williamson | |
| 2010/0071830 | A1 | 3/2010 | Putzer | |

FOREIGN PATENT DOCUMENTS

| | | |
|---|---|---|
| DE | 69103377 | 2/1995 |
| DE | 69314397 | 1/1998 |
| DE | 19644160 | 4/1998 |
| DE | 202005002793 | 4/2005 |
| DE | 69928019 | 7/2006 |
| FR | 2659899 | 9/1991 |
| GB | 2429688 | 3/2007 |
| WO | 2008028524 | 3/2008 |
| WO | 2010103441 | 9/2010 |

OTHER PUBLICATIONS

Search report in corresponding German Application No. 10 2010 011 388.3.

* cited by examiner

*Primary Examiner* — Katarzyna Wyrozebski Lee
*Assistant Examiner* — Joshel Rivera
(74) *Attorney, Agent, or Firm* — Onello & Mello, LLP

(57) ABSTRACT

An apparatus for processing strips of labels includes a strip of labels having a plurality of individual labels following one after the other. The apparatus includes a conveying device that conveys the strip of labels along a conveying path, and a position detection device provided along the conveying path that detects a position of the strip of labels. The apparatus includes a processing device that is provided along the conveying path. The processing device includes a cutting unit that is constructed and arranged to cut the strip of labels. The apparatus includes a labelling device that is arranged downstream with respect to the processing device along the conveying path. The labelling device is constructed and arranged to attach processed labels to containers. The position detection device includes an image detection device that is configured to capture two-dimensional images of regions of the strip of labels.

20 Claims, 2 Drawing Sheets

APPARATUS FOR PROCESSING STRIPS OF LABELS AND METHODS OF PROCESSING STRIPS OF LABELS

RELATED APPLICATIONS

This application claims priority to German Patent Application No. 10 2010 011 388.3, filed Mar. 12, 2010, the contents of which is incorporated herein by reference in its entirety.

TECHNICAL FIELD

The present inventive concepts generally relate to apparatuses and methods for processing strips of labels, and more particularly, to apparatuses and methods for cutting and positioning strips of labels.

SUMMARY

In one aspect, an apparatus for processing strips of labels with a plurality of labels following one after the other, with a conveying device which conveys the strip of labels along a pre-set conveying path, with a processing apparatus which is provided along the conveying path and which processes the strip of labels in a pre-set manner, and with a position detection device which detects a position of the strip of labels in its conveying direction, wherein the processing device has a cutting unit which cuts the strip of labels, and the apparatus has a labelling device which is arranged downstream with respect to the processing device in the conveying direction of the strip of labels and which attaches labels to containers, wherein the position detection device has an image detection device which is suitable for recording two-dimensional images of areas of the strip of labels.

In some embodiments, the position detection device is orientated towards a region of the strip of labels which also contains at least one region between the label edges.

In some embodiments, the apparatus has a control device for controlling the conveying device, which controls the conveying device in a manner dependent upon a signal emitted by the position detection device.

In some embodiments, the apparatus has a memory device in which at least one reference image is stored.

In some embodiments, the apparatus has a comparator which compares the reference image with the image recorded by the position detection device.

In some embodiments, the apparatus has an illumination device for illuminating the area of the strip of labels recorded by the position detection device.

In another aspect, a method of processing strips of labels comprises a plurality of labels, wherein the strip of labels is conveyed by a conveying device along a pre-set path and is processed by a processing device during this conveying along the path, wherein a position of the strip of labels is detected by means of a position detection device, and wherein the labels are then attached to containers, wherein the position detection device records a two-dimensional image of an area of the strip of labels, and the position of the strip of labels is determined on the basis of this image.

In some embodiments, at least the processing device or the conveying device is controlled on the basis of the image recorded by the position detection device.

In some embodiments, an offset between an actual position of the strip of labels with respect to a nominal position of the strip of labels is determined on the basis of the detected position of the strip of labels, and the processing device or the conveying device is preferably controlled on the basis of this offset.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

DETAILED DESCRIPTION

Figure 1:
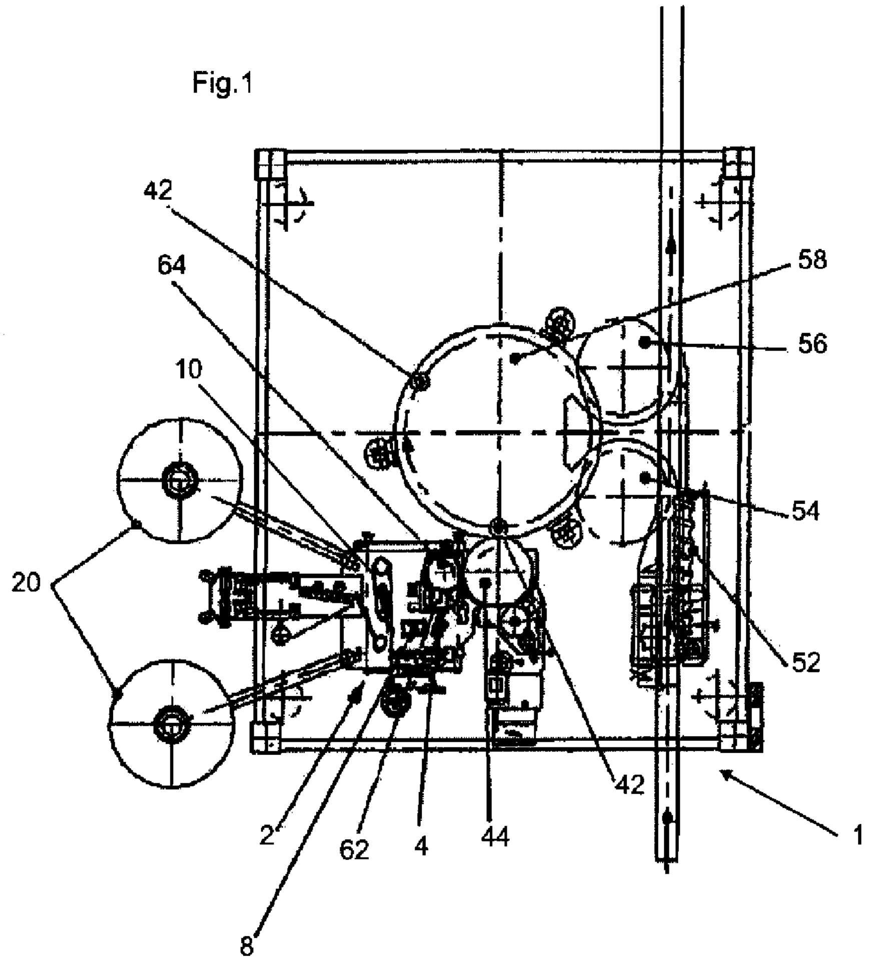
FIG. 1 is a diagrammatic illustration of an apparatus for processing strips of labels, in accordance with embodiments of the present inventive concepts.

In some types of labelling machines such as for example labelling machines for cutting labels, labels may be first cut and then secured by adhesion to a bottle or container. These endless labels or sleeve labels may be processed from a roll. For example, endless labels may be cut at an exact longitudinal position relative to an imprint, and may be then secured by adhesion to a bottle or container with a slight overlap around the generally cylindrical bottle or container to be labelled.

In some cases, different influencing factors may have the effect that the actual length of an individual label of the endless label or roll is subjected to slight tolerances at the moment of cutting. These factors can include, for example manufacturing tolerances, deviations of material, temperature fluctuations or even different tensile stresses on the label. For these reasons, a cut in a rigid length module is disadvantageous, rather it is necessary for the actual label length to be measured in particular on-line in order to keep the cutting position constant relative to the imprint.

In order for labelling machines to arrive at the cutting position with a high degree of precision, conventional labels are generally provided with defined positions that have a strongly contrasting colour bar, such as, a crop mark. The endless label or roll has generally been guided at high speed along a very rapidly shifting optical position sensor. The defined position or crop mark can be clearly recognized by the optical position sensor, in which case a precise determination of the label position can be determined. Accordingly, it can be possible to determine a cutting position on account of the high temporal resolution. A corresponding expansion of the crop mark transversely to the conveying direction of the label can result in an adequate tolerance with respect to lateral guidance tolerances. This crop mark, however, is felt to be intrusive in part by customers. In order to overcome the intrusiveness of the crop mark, positioning of the label can be carried out, for example, in wrap-around labelling machines. During labelling procedures, wrap-around labelling machines may cover the crop mark by overlapping a portion of the label in an overlap area with the opposite end of the label.

Conventional wrap-around labelling machines, such as the labelling machine disclosed in DE 20 2005 002 793 U1, are generally known. In this case a labelling unit is provided which comprises a label roll, a label supply means, a cutting device, a gripper cylinder and at least one gluing unit, the cutting device being formed by a rotating vacuum roller in a rotating separating element. The separating element has at least one separating tool and, in particular, a cutting blade.

DE 196 44 160 A1 describes a labelling unit, in which a label sheet in the form of a band is drawn off from a store and this sheet is moved in an advancing direction and is cut off with a cutting unit to a length to form labels in each case. In this case a roll drive is provided, the conveying speed of which is smaller by a factor set or selected beforehand than the conveying speed of a first roll drive in order to achieve a defined pre-stretching of the label sheet. With this apparatus a mark recognition device is provided which precedes a cutting unit. A control device of the cutting roller or the start or the end of the labels is monitored with this mark recognition device.

WO 2008/028 524 describes a method of applying labels to bottles in a precise position; corresponding U.S. Patent Application No. 2010/0071830, filed Mar. 2, 2009, is incorporated by reference herein in its entirety. In this method, a design feature—typical of the containers—of each container moving past a camera is detected, and it delivers a signal which controls the labelling procedure. In this way, it is possible to ensure that after the application the label is positioned in an optimum manner with respect to the design feature typical of the containers. In this case, however, no adjustment or correction is made with respect to the respective cuts of the strips of labels.

Problems arise when a wrap-around label consists substantially of a transparent sheet of plastics material. In this case, the overlapping of the crop mark can no longer be concealed from the eyes of the customer. In other words, in this case the crop mark is visible despite the overlapping procedure. The operators of filling plants therefore require an apparatus and method of positioning labels on containers, which can conceal crops marks from the eyes of the customer. In the case of sleeve machines a visible crop mark cannot be covered in principle and is therefore likewise felt to be intrusive.

In addition, depending upon the imprint on the label, ambiguities can arise in the prior art. For example, in such cases a sensor may no longer detect the crop mark. In these cases labels must be adapted in the colour, contrast and position of the crop mark to the extent that ambiguities no longer arise. This can be problematic, when the imprint or format of the label is changed, the respective sensor frequently has to be adjusted and set mechanically, and further has to be adjusted electrically or parameterized in system software. As a result, this entails expenditure of time and effort, and the possibility of errors can arise. An object of the present inventive concepts is therefore to provide an apparatus and method for processing strips of labels, which can operate without the use of the crop marks as mentioned above.

In some apparatuses and methods, crop marks of fluorescent UV dyes are used for positioning, which are invisible to humans. These crop marks can be detected by optical sensors; however, a drawback of crop marks of this type is that they are expensive for use on a large scale.

In some apparatuses and methods, one or more parallel optical position sensors, which react to specified features in the label imprint, are provided. However, these apparatuses and methods may work only with an imprint having suitably clear features that do not occur repeated on one line. Therefore, the scope for using this solution is relatively narrow. In addition, the susceptibility to lateral guidance tolerances may be too great in many cases.

In some apparatuses and methods a line camera is provided, which records an image of the label with a defined width. The length of the image obtained, starting from the current sensor position, is likewise constant. On account of a continuous comparison of the current image with a filed pattern, for example by means of a planar correlation method, it is possible to detect the position of the label exclusively with reference to the imprint. Since very high conveying speeds of the labels occur in practice, however, very fast line sensors of up to 100 K lines per second are necessary for this purpose, in order to achieve an acceptable degree of position accuracy. This in turn results in very short exposure times of the individual lines in the region of 10 μs, which in turn requires a very high light density of the illumination. In addition, very powerful and expensive hardware is required for image processing, so that as a whole the factors result in a very complicated and expensive solution.

An apparatus according to the present inventive concepts is constructed and arranged to process strips of labels having a plurality of labels following one after the other. For example, the strips of labels may be provided as a roll. The apparatus may include a conveying device, which conveys the strip of labels along a pre-set conveying path. In addition, a processing device may be provided, which is provided along the conveying path and which processes the strip of labels in a pre-set manner. In addition, a position detection device may be provided, which detects a position of a label of the strip of labels in its conveying direction.

According to the present inventive concepts, the position detection device may include an image detection device, which is constructed and arrange to record two-dimensional images of areas of the strip of labels. For example, the image detection device can include a camera. These areas can form a portion of the strip or the entire strip both in the conveying direction and transversely thereto. In this manner, not only marks but in each case images can be captured and recorded with the aid of the image detection device. The strip of labels can be a band of labels where the labels are imprinted on a band one behind the other. It is also possible, however, for the strip of labels to be a tube from which the individual pieces (in that case sleeve-like) are cut off in order to be then pushed over the containers.

On account of the image recording and evaluation it is advantageous for an actual position of the band of labels to be detected in order that corrections which may possibly be necessary—for example with respect to the conveying speed or with respect to the processing procedure—may be carried out in this manner.

In this manner, some embodiments according to the present inventive concepts are directed to measuring the position of labels at high speed only with reference to the label imprint, and preferably by way of a sensor device based upon an inexpensive matrix camera. In this manner, the sensor can be advantageously connected to a control system, which can advance the endless label in accordance with a closed regulating circuit. Accordingly, the apparatuses, systems and methods of the present inventive concepts allow a cutting position to be kept permanently within a narrow tolerance window.

The processing device may include a cutting unit, which is constructed and arranged to cut the strip of labels. This can be for example a cutting blade which co-operates with a cutting roller; however, other cutting devices, which are based on lasers for example are also possible.

In some embodiments, the position detection device can be oriented toward a region of the strip of labels which also contains at least one region between the label edges. These label edges can be the two side edges of the label which are situated at the top and the bottom in the conveying direction for example. For example, the position detection device can be oriented toward a region of the strip of labels which is at a distance from the two label edges, for example, a predetermined distance. In this manner, a region of the imprint of the actual label, which is naturally present in the labels can be used for detecting the position of the label and/or labels of the strip of labels. On account of the orientation towards a preferably central region of the strip of labels it is also possible to change out the system and/or apparatus with different labels without having to rearrange the position sensor and/or adjusted the operation of the position sensor. This can be achieved because the labels have regularly specified imprints. It is advantageous for the captured and/or recorded image to include the entire width of the strip of labels, so that even the most widely differing positions can be recorded and so the justification can preferably be carried out on any desired images.

In some embodiments, the apparatus includes a control device for controlling the processing device, which controls the processing device in a manner dependent upon a signal emitted by the position detection device. In principle, or in an alternative manner, it is possible for the control device also to be used for controlling the conveying device, and for the control device to control the conveying device in a manner dependent upon a signal emitted by the position detection device. It is further possible for the control device to control any one the devices, systems or features of the apparatus. In this manner, it is possible to measure the position of the labels with a high degree of precision, for example, only with reference to an imprint of the labels. In this case, as mentioned, it is advantageous for the position detection device to be integrated with the control device of the conveying device of the label strip in a closed regulating circuit. The entire system and apparatus thus permits the cutting position to be kept permanently in a narrow tolerance window.

In some embodiments, it may be preferable for the control device to be provided with or determine the average length of an individual label. This length can be determined by measuring in turn in clock increments which for example are produced by a high-resolution incremental encoder arranged, for example flange-mounted, on the label drive. For example, the control device can moved the endless label forward by a number of clock increments which corresponds to a length of the individual label, the position detection device can be triggered to capture and/or record an image of the label. This image recording position, which in turn is measured in clock increments, can be stored temporarily in the control device and/or in the camera as a reference position.

In some embodiments, the camera need not capture and/or record the entire area of the individual label at the same time. For example, in the case of wrap-around labels, which are relatively long as compared with their width, capturing and/or recording a portion of the label, for example ⅓ of the length of the label, is sufficient. However, in some instances, this portion must have a suitable characteristic feature which can be identified and compared in a simple manner by image processing methods, which can be carried out in the control device.

In some embodiments, the position detection device may include an electronic camera, such as for example a CCD or CMOS camera.

In some embodiments, where the characteristic feature named is not present in the captured and/or recorded portion of the label, for example after adhesion of two label rolls whilst violating the pattern, it is advantageous for a special routine to be present which synchronizes the advance of the labels again. This can be carried out for example in such a way that with little power a plurality of images of successive portions of the label are captured and/or recorded with some overlapping, until the characteristic feature is found again and the advance is then controlled in such a way that the feature appears again at the correct place in the camera image.

The apparatus may includes a memory device in which at least one reference image is stored. The reference image can be for example a reference image which the same position detection device has recorded beforehand. A plurality of reference images for different labels can be Stored in the memory device, and for example, the user of the apparatus may be able to select a specified reference image in each case or for a control device to select the correct reference image automatically from a plurality of stored images.

The apparatus may include a comparator, which compares this reference image with the image captured and/or recorded by the position detection device. After this comparison the exact actual position of the band of labels can be determined, in particular with respect to a nominal position. Expressed more precisely, a relative position of the band of labels can be determined by this.

The comparator can include a processor, a microprocessor or other processing device, which can be configured to compare a reference image with a captured and/or recorded image.

For example, in some embodiments, a camera with a VGA or WVGA resolution, i.e. a resolution of 640×480 or 720×480 pixels respectively, can be used; however, cameras with other resolutions may be used. In this way it is possible to achieve a resolution of 0.2 mm/pixel if the image area is selected to be not greater than 120 mm×90 mm. Such image areas, however, are sufficient to detect the most widely differing labels. In addition, it is also be possible for a plurality of recordings to be triggered in succession where necessary if output levels are not excessively high and for the recordings to be processed in a corresponding logical manner. In addition, it is also possible for sensors with a higher pixel number to be used or for a smaller image portion to be selected for the sake of greater accuracy.

The apparatus may include an illumination device (optional) for illuminating the area of the strip of labels captured and/or recorded by the position detection device. For example, in the case of labels which have a high gloss level, an illumination device of this type is advantageous. The illumination device may be clock-timed. The illumination device may include a flash lamp illumination device, which is triggered to respond to the image-recording device.

The illumination device can be configured to radiate diffuse radiation, in particular diffuse light. In this case the light emitted by the illumination device can be in particular white light, but it is also possible for light of different colours to be used. This can also be light in the near UV or IR range. The aim of the spectral design of the illumination is to see how the optimum contrasts for the evaluation can be achieved. In some embodiments, it is preferable for a strongly diffuse illumination to be used as a so-called cloudy day illumination.

An optically homogeneous background may be provided on a side of the strip of labels facing away from the image detection device. In particular, the background may be provided for detecting or processing transparent labels of plastics material. For example, a defined optically homogeneous background can be provided on the side of the strip of labels facing away from the camera. As an alternative or in addition, it is also possible, in particular for partially transparent labels, for a preferably diffuse backlight illumination to be provided on the side facing away.

The sensor or the image recording device can be configured to evaluate the respective camera image in which it compares the actual image currently recorded with a pattern (learnt beforehand by teaching methods for example). In this way it is possible for the exact position of the label, both in the conveying direction and transversely thereto, to be determined with a high resolution. It is also possible, however, for other evaluation methods to be used in this case.

In addition, it is also possible, by a suitable method of comparing the patterns, for the accuracy of measurement achieved during this to be set higher than the camera resolution in pixels. In this case for example, electronic or software screens can be used, which are applied to the images captured and/or recorded in each case. Electronic screens of this type could single out specified areas of a captured and/or recorded image or could weight specified areas differently with respect to other areas.

The detected position result in the conveying direction constitutes an offset with respect to the reference position of the image recording. Since the endless label can be conveyed from image to image by approximately the length of the individual label, this offset is only the deviation from the actual to the nominal position. This result can therefore be used in order to regulate—in a control loop with a suitable regulating method—the advance of the labels in an exact manner to the actual length of the labels. In this way it is possible to ensure that the cutting position relative to the imprint is kept permanently within a very small tolerance range. The resulting accuracy can likewise be increased by suitable regulating methods which advantageously average over a plurality of images recorded in succession.

The position result transversely to the conveying direction can be used to regulate the lateral guidance of the labels. To this end, a single sensor has been conventionally used, which can be dispensed with, however, with the solution proposed according to the present inventive concepts. In this way it is possible for a comparison between a position of the band of labels to be carried out not only in the conveying direction but also transversely thereto.

The apparatus may include a magazine device arranged upstream with respect to the position detection device in the conveying direction of the strip of labels in order to receive the strip of labels. This can include for example a roll magazine which has a plurality of rolls from which the strips of labels are unrolled.

The apparatus may include a labelling device which is arranged downstream with respect to the processing device in the conveying direction of the strip of labels and which attaches the labels to containers. In this case for example the labels can be secured to the containers by adhesion, but it would also be possible for the labels to be present in the form of so-called sleeve labels which are shrunk onto the containers.

The present inventive concepts further relate to methods of processing strips of labels comprising a plurality of labels, in which the strip of labels is conveyed by a conveying device along a pre-set path and is processed by a processing device during this conveying along the path, and in which a position of the strip of labels is detected by a position detection device.

The detection device may capture and/or record one or more two-dimensional images of an area of the strip of labels, and in response to the capturing and/or recording of the one or more images, the position of the strip of labels can be determined.

For example, the position of the strip of labels in the conveying direction of the strip of labels can be determined in this case. As mentioned above, a suitable processing of the strip of labels can be carried out on the basis of this position, for example, a cutting of the strip of labels.

In some embodiments, at least one of the processing device and the conveying device can be controlled on the basis of the image captured and/or recorded by the position detection device. This means that, in particular, the advance of the band of labels can be controlled on the basis of the images recorded or on the basis of comparisons made.

A comparator may be provided for comparing the image captured and/or recorded by the position detection device with a reference image in order to determine the position of the strip of labels in this way. In this case it is particularly preferred for the image in particular also of a central area of the strip of labels to be recorded.

An offset between an actual position of the strip of labels with respect to a nominal position of the strip of labels can be determined on the basis of the determined position of the strip of labels, and the processing device or the conveying device is preferably controlled on the basis of this offset. This means that the offset determined is used as an evaluation result in order in particular to adapt a speed of the conveying device for the strip of labels.

FIG. 1 is a diagrammatic illustration of an apparatus 1 according to the present inventive concepts. In this case the reference number 4 designates a processing device that can process a strip of labels 10 and can cut it relatively precisely. The strip of labels 10 can be [un]rolled in an alternating manner from two label rolls 20 and can be conveyed by means of a conveying device designated 2 in its entirety. The reference number 4 designates a processing device such as a cutting device in this case. This cutting device can include a vacuum roller 64 on which the label is held. The reference number 62 designates a separating element such as for example a cutting blade for cutting the labels. This cutting device can be followed by a gripper cylinder 44 for gripping the cut strip of labels. The reference number 42 designates the containers to be labelled, such as for example plastic bottles.

These plastic bottles can be conveyed to a turntable 58 and can be provided with the labels there. The containers can be supplied individually by way of an inlet wheel 54 through the turntable 58 by way of a conveying screw 52 and can be removed again by way of an outlet wheel 56.

Figure 2:
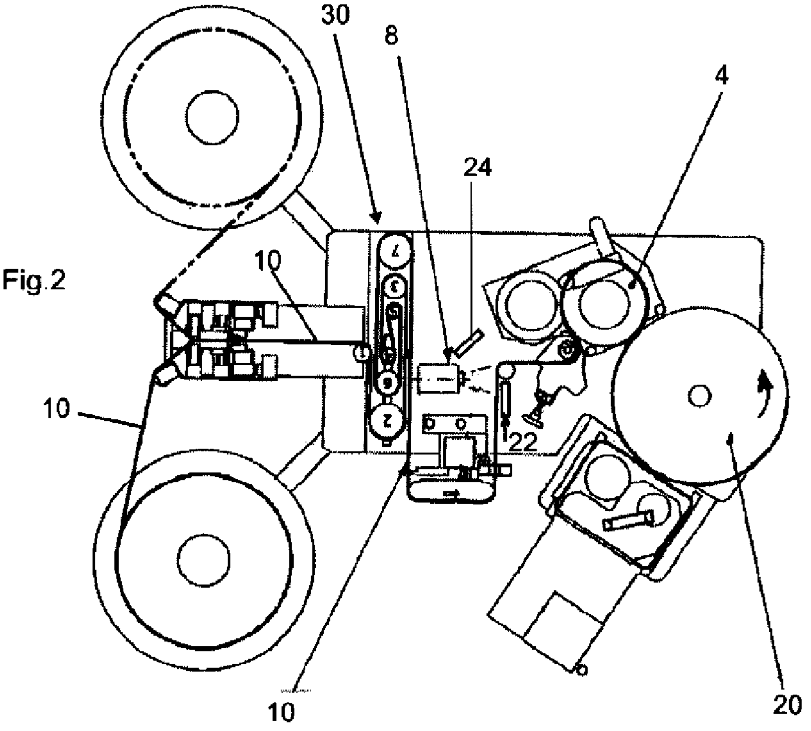
FIG. 2 is a detailed view of the conveying device illustrated in FIG. 1, in accordance with embodiments of the present inventive concepts.

FIG. 2 is a detailed view of an apparatus according to the present inventive concepts. In this case the band of labels 10 is first shown, which can be guided through the plant and from which the strips of labels are in turn cut off. The reference number 30 designates in its entirety a buffer device for the band of labels 10. In this buffer device 30 the band of labels can be passed around a plurality of rolls, these rolls being movable with respect to one another. If for example one of the rolls 20 has run empty and the plant has to be provided with a new roll, then during this time the entire plant can continue to run and the band of labels is supplied from the buffer device 30 accordingly.

Starting from this buffer device 30 the band of labels (or the strip of labels) can be conveyed further and in this case, in particular, it can be conveyed past a position detection device 8, which can be used to detect the exact position of the band of labels. An illumination device 24, which can illuminate the band of labels 10, can also be provided beside the position detection device 8 which in this case can be equipped as a camera. In addition, a background 22 can also be provided beside the illumination device on the side facing away from the camera 8.

In this case the illumination device 24 can be illustrated obliquely, but it would also be advantageously possible for the illumination device 24 to be arranged for example around the position detection device 8 or even for a plurality of illumination devices to be provided.

The position detection device 8 can be now adjoined by the actual cutting device 4 for cutting the strips of labels.

Figure 3:
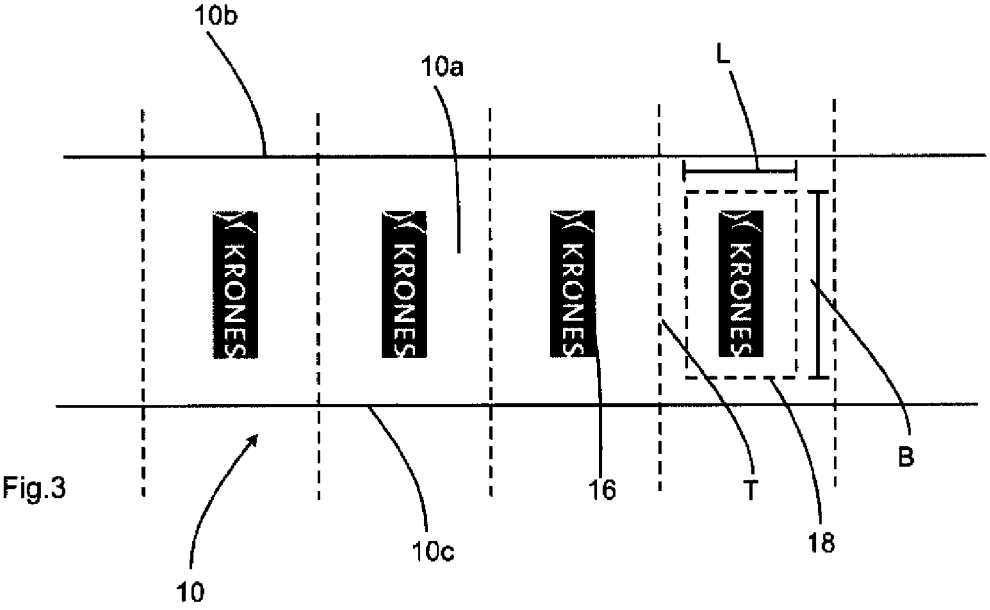
FIG. 3 is a diagrammatic illustration of a strip of labels, in accordance with embodiments of the present inventive concepts.

FIG. 3 shows a strip of labels 10 diagrammatically. In this case this strip of labels 10 has a plurality of labels 10*a* which are provided with an imprint 16 in each case. For example, the strip of labels 10 can be continuous in the sense that the individual labels 10*a* follow one after the other. The reference letter T designates the line along which the cutting device is intended in an ideal manner to cut the individual labels. The references 10*b* and 10*c* designate the upper and lower edges of the strip of labels. The reference letter B designates that area which in an advantageous manner is detected in the direction of the width of the strip of labels 10 by the position detection device. In this way it would be possible for the image detection device to capture and/or record images of the width B and the length L in each case, so as to ensure that the image element 16 is situated in each case in the region of the recorded image irrespectively of its actual position.

In this case the image area 18 captured and/or recorded by the position detection device 8 can be selected to be such that the nominal position of the image element 16 is situated substantially centrally inside the image area in the direction of movement of the band of labels. In this way it is possible to ensure that the image element 16 is captured and/or recorded completely even if the actual position of the strip of labels deviates from its nominal position.

The position detection device in this case can capture and/or record the image element 16, and can compare it with a reference pattern. In some embodiments, the captured and/or recorded image can be compared at a comparator 14 of a control device 15. In this way it is possible to establish at which actual position the strip of labels is present. The cutting procedure or even the conveying procedure of the strip of labels 10 can be adjusted in a manner dependent upon this actual position. The reference letter P designates the conveying path of the strip of labels which extends from the rolls 20 as far as the processing device 4 or cutting device.

In the event that the image element 16 is no longer situated completely in the image area 18 of the position detection device, a comparison with the reference pattern can also be carried out. Special routines can optionally be available for this. In this case it would be possible for the image area 18 of the position detection device 8 to be selected to be substantially smaller than the label to be detected and it is aimed for example only at a relatively small image element. In addition, it would be possible for the image area 18 to represent the image area of the position detection device 8 theoretically capable of being recorded and, depending upon the label to be processed, for only different areas of this image area to be selected in order to carry out the comparison. In this way, in the case of FIG. 3 the referencing could be carried out for example only on the logo illustrated.

Figure 4:
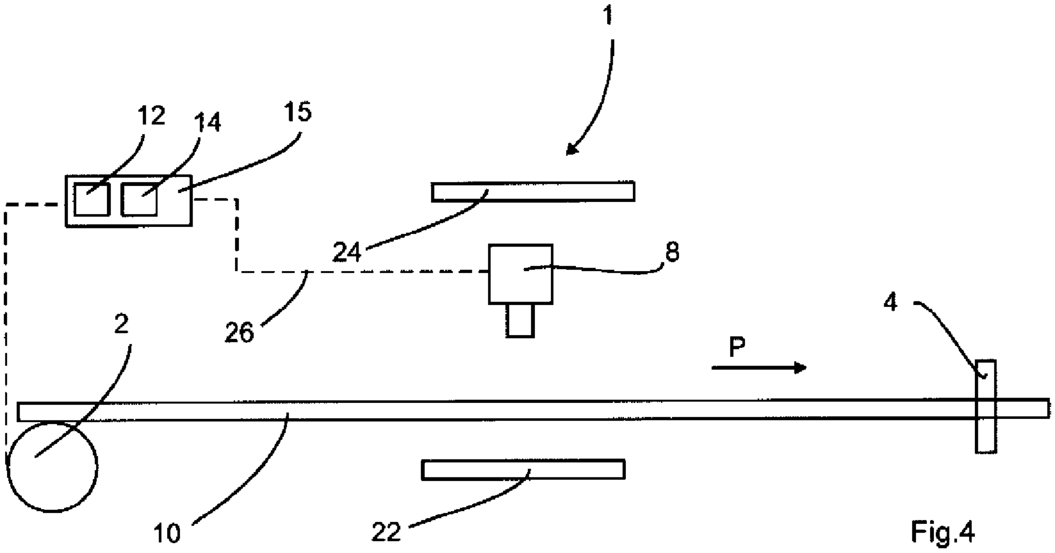
FIG. 4 is a diagrammatic illustration in outline of an apparatus, in accordance with embodiments of the present inventive concepts.

FIG. 4 is a diagrammatic illustration of an apparatus according to the present inventive concepts. In this case the reference number 2 designates in a diagrammatic manner a conveying device which conveys the strip of labels 10. This conveying device 2 can be controlled by a control device 15. Images of the strip of labels can be captured and/or recorded in each case by the position detection device 8, in which case, as mentioned above, an illumination device 24 illuminates the strip of labels and the imaging is carried out with respect to a background 22.

The position detection device can be connected to the control device 15 by way of a connecting line 26. In this case the control device 15 can also have a memory device 12, in which reference images are filed and/or stored, and also a comparator 14, which compares the images captured and/or recorded by the position detection device 8 with the images filed and/or stored in the memory device 12. In reaction to this comparison the conveying device 2 can delay or accelerate for example the advance of the strip of labels 10, so that the processing device 4, having the cutting device, can cut the strips of labels at the pre-set nominal position, i.e. the line T in FIG. 3.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. An apparatus for processing strips of labels, comprising:

a strip of labels including a plurality of individual labels following one after the other;

a conveying device that conveys the strip of labels along a conveying path;

a position detection device provided along the conveying path that detects a position of the strip of labels;

a processing device that is provided along the conveying path, wherein the processing device includes a cutting unit that is constructed and arranged to cut the strip of labels in response to the position detected by the position detection device;

a labelling device that is arranged downstream with respect to the processing device along the conveying path, the labelling device constructed and arranged to attach processed labels to containers, wherein the position detection device includes an image detection device that is configured to capture two-dimensional images of regions of the strip of labels and wherein the labeling device comprises a vacuum roll on which the label is held and a separating element for cutting the labels; and an illumination device arranged to illuminate the strip of labels and a background arranged on the opposite side of the strip of labels from the image detection device.

2. The apparatus according to claim 1, wherein the position detection device is oriented toward a region of the strip of labels that includes at least one region between edges of the label.

3. The apparatus according to claim 1 further comprising a control device that is configured to control the conveying device, wherein the conveying device is controlled in response to a control signal emitted by the position detection device.

4. The apparatus according to claim 3, wherein the control device includes a memory device configured to store at least one reference image.

5. The apparatus according to claim 4, wherein the control device includes a comparator that is configured to compare the reference image with an image captured by the position detection device.

6. The apparatus according to claim 1 further comprising an illumination device that is constructed and arranged to illuminate the area of the strip of labels that is captured by the position detection device.

7. The apparatus according to claim 1, wherein the processing device is configured to process the strip of labels in a pre-set manner.

8. A method of processing strips of labels, comprising:

providing a strip of labels including a plurality of individual labels;

conveying the strip of labels along a path at a conveying device;

processing the strip of labels while being conveyed along the path at a processing device;

detecting a position of the strip of labels at a position detection device, the position detection device provided ahead of the processing device along the path; and attaching processed labels to containers, wherein the position detection device captures a two-dimensional image of a region of the strip of labels, and the position of the strip of labels is determined in response to the captured two-dimensional image and wherein the labels are held by a vacuum roller; and providing an illumination device to illuminate the strip of labels and a background on the opposite side of the strip of labels from the image detection device.

9. The method according to claim 8, wherein at least one of the processing device and the conveying device is controlled in response to the two-dimensional image captured by the position detection device.

10. The method according to claim 8, wherein an offset between an actual position of the strip of labels with respect to a nominal position of the strip of labels is determined on the basis of the detected position of the strip of labels, and the processing device or the conveying device is controlled on the basis of this offset.

11. The method according to claim 8, wherein the path is a pre-set path.

12. The apparatus according to claim 1, wherein the apparatus comprises a buffer device for the band of labels.

13. The apparatus according to claim 12, wherein the buffer device comprises a plurality of rolls, the rolls being movable with respect to one another.

14. The apparatus according to claim 1, wherein the containers are bottles.

15. The apparatus according to claim 1, wherein the apparatus further comprises an illumination device for illuminating the area of the strip of labels recorded by the position detection device.

16. The apparatus according to claim 15, wherein the illumination device includes a flash lamp illumination device, which is triggered to respond to the image-recording device.

17. The apparatus according to claim 1, wherein the position detection device is integrated with the control device of the conveying device of the label strip in a closed regulating circuit.

18. The apparatus according to claim 1, wherein the cutting unit is followed by a gripper cylinder arranged downstream with respect to the cutting unit along the conveying path for gripping the cut strip of labels.

19. The method according to claim 10, wherein the image recording position can be stored temporarily in at least one of the control device or the camera as a reference position.

20. The method according to claim 10, wherein plastic bottles are conveyed to a turntable and are provided with the labels at the turntable.

* * * * *